US012780100B2

(12) United States Patent
Pantea

(10) Patent No.: US 12,780,100 B2
(45) Date of Patent: Nov. 3, 2026

(54) RUNNING BOARD STEP—2 PIECES EXTRUSION BOARD

(71) Applicant: Magna Exteriors Inc., Aurora (CA)

(72) Inventor: Sorin O. Pantea, Woodbridge (CA)

(73) Assignee: Magna Exteriors Inc., Aurora (CA)

( * ) Notice: Subject to any disclaimer, the term of this patent is extended or adjusted under 35 U.S.C. 154(b) by 728 days.

(21) Appl. No.: 18/249,396

(22) PCT Filed: Oct. 22, 2021

(86) PCT No.: PCT/IB2021/059778

§ 371 (c)(1),
(2) Date: Apr. 18, 2023

(87) PCT Pub. No.: WO2022/084953

PCT Pub. Date: Apr. 28, 2022

(65) Prior Publication Data

US 2023/0415653 A1 Dec. 28, 2023

Related U.S. Application Data

(60) Provisional application No. 63/104,864, filed on Oct. 23, 2020.

(51) Int. Cl.
*B60R 3/00* (2006.01)

(52) U.S. Cl.
CPC .................................... *B60R 3/002* (2013.01)

(58) Field of Classification Search
CPC ............ B60R 3/002; B60R 3/02; B61D 23/00
See application file for complete search history.

(56) References Cited

U.S. PATENT DOCUMENTS

| | | | | |
|---|---|---|---|---|
| 4,151,895 | A | 5/1979 | Rasada, Jr. et al. | |
| 6,955,370 | B2 * | 10/2005 | Fabiano | B60R 3/02 280/166 |
| 8,016,309 | B2 * | 9/2011 | Flajnik | B60R 3/002 280/169 |
| 9,937,865 | B1 | 4/2018 | Oakey | |
| 11,541,815 | B2 * | 1/2023 | Schoonover | B60R 3/002 |
| 11,590,896 | B2 * | 2/2023 | Mantovani | B60R 3/002 |
| 2003/0011163 | A1 | 1/2003 | Coomber et al. | |

OTHER PUBLICATIONS

Supplementary European Search Report for Application No. EP21882301, dated Feb. 14, 2024, 1-page.
First Office Action for Application No. EP21882301.1, dated Oct. 4, 2024, 8-pages.
International Search Report for PCT/IB2021/059778 mailed Feb. 14, 2022, 1-page.

* cited by examiner

*Primary Examiner* — Steve Clemmons

(57) ABSTRACT

A step board that is a multi-piece board including at least a first piece and a second piece that can be easily pierced at predetermined locations to create predetermined apertures for attaching step board assembly components, such as step mats, end caps, bracket attachments, and etc. The first and second pieces are then secured together.

15 Claims, 4 Drawing Sheets

RUNNING BOARD STEP—2 PIECES EXTRUSION BOARD

CROSS-REFERENCE TO RELATED APPLICATIONS

This application is a National Stage of PCT International Patent Application No. PCT/IB2021/059778, filed Oct. 22, 2021 and claims the benefit of U.S. Provisional Patent Application No. 63/104,864, filed Oct. 23, 2020. The disclosures of the above applications are incorporated herein by reference.

FIELD OF THE INVENTION

The present invention relates to a running board step adapted for a vehicle.

BACKGROUND OF THE INVENTION

Running boards are known for assisting with occupant ingress/egress from vehicles as well as access to vehicle roof tops and cargo beds of vehicles, including sport utility vehicles and pickup trucks, often disposed adjacent to a rocker panel. Common running boards are fixed or stationary. Other known running boards actuate between a stored position and at least one step extended position. The user steps onto a step surface of the running board when desired.

A current step board design consists of a closed extruded aluminum section with machined holes. Due to profile configuration of the step board, in most of the cases using a punch die to pierce holes is not feasible with a closed aluminum section.

Accordingly, there is desired a running board step incorporating design features that can be more easily pierced.

SUMMARY OF THE INVENTION

In accordance with the present invention, there is provided a 2-piece extruded running board step. The step board has a section split in two—a first and a second section, e.g., an upper and a lower section, operably adapted to be easily pierced. This also allows for a few options to be used to operably attached/secure the at least two sections together.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
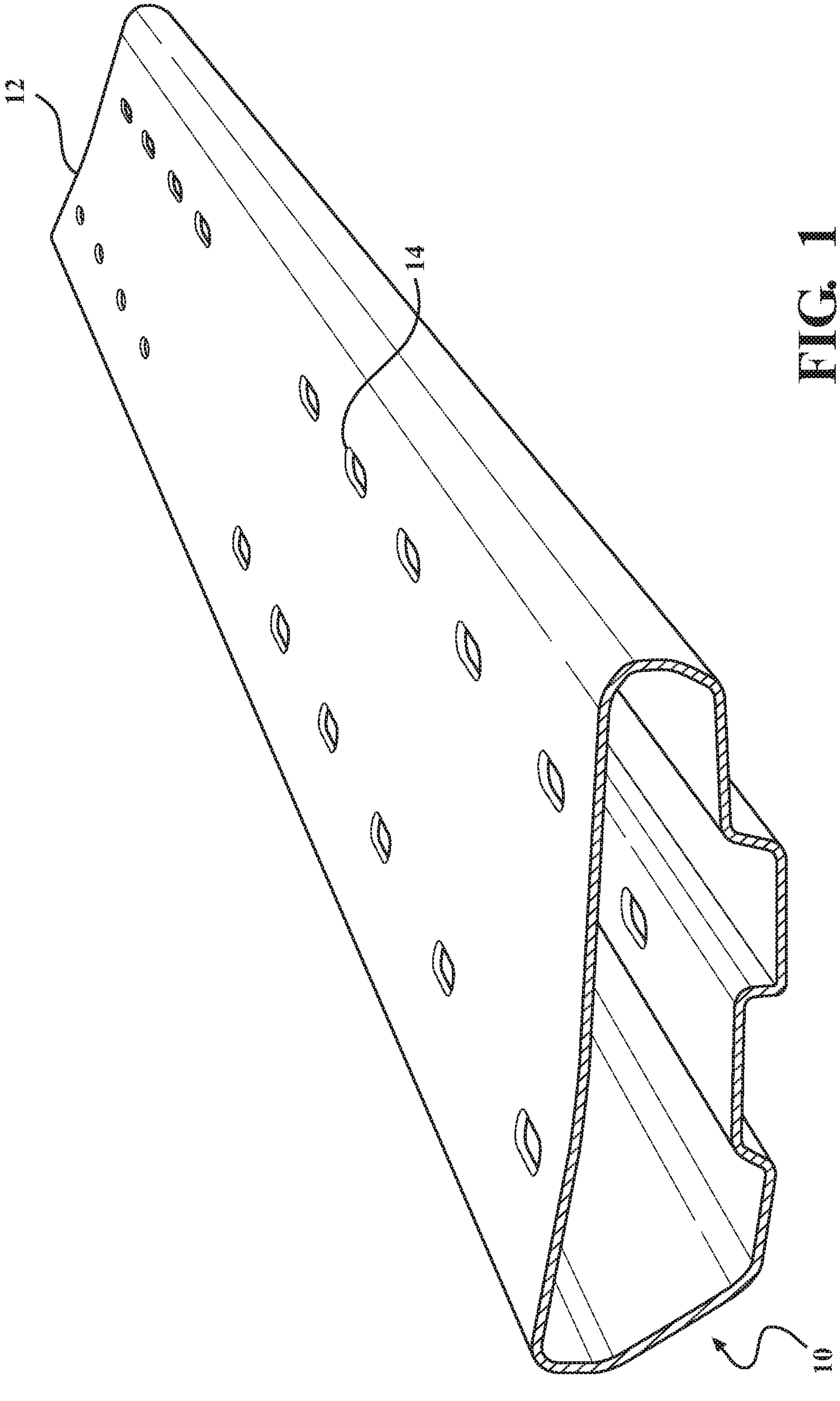
FIG. 1 PRIOR ART
FIG. 1 is a perspective view of a prior art step board.

FIG. 1 depicts an example of a prior art step board shown generally at 10. The step board 10 design consists of a closed extruded aluminum section with machined holes (holes are required for step mat, end cap, bracket attachment, etc.). The step board 10 is a one-piece closed section of aluminum with machined extrusion ends 12, at both ends, and all the holes 14 in the top surface and bottom surface of the step board 10 are machined. A most cost-effective solution is to pierce these holes 14 and trim the ends 12 in a punch die, but due to the profile configuration, in most of the cases this is not feasible with a closed aluminum section.

Referring generally to FIGS. 2-7, in accordance with the present invention, there is provided a step board section split in at least two—a first and second section, e.g., an upper and a lower section, that can then be easily pierced in accordance with aspects of the present invention. The sections incorporate attachment features. After piercing, there are a few options in accordance with the present invention that are used to attach/secure the two sections together.

Figure 2:
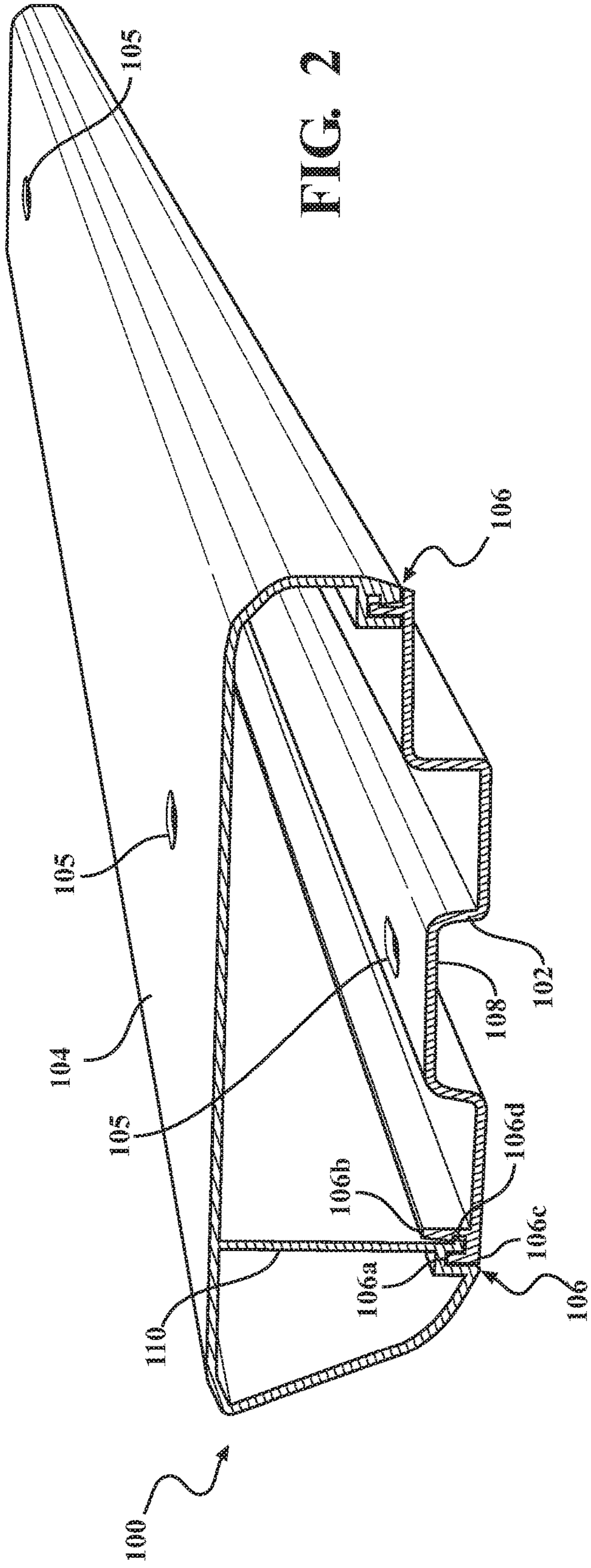
FIG. 2 is a perspective view of a multi-piece step board incorporating attachment features including at least one hook feature, in accordance with the present invention.

Referring generally to FIG. 2 there is depicted a step board shown generally at 100 in accordance with the present invention that is a split design. The step board 100 is a multi-piece board, most preferably, a two-piece board. The step board 100 includes at least one first piece 102 (e.g., lower section) and at least one second piece 104 (e.g., upper section) that can each be operably easily pierced at predetermined location(s) to create at least one aperture 105; generally, a plurality of apertures 105 at a plurality of predetermined locations (e.g., apertures required for step mats, end caps, bracket attachments, and etc.). The at least one aperture 105 is preferably made before both the first and second pieces 102,104 are operably secured together, e.g., suitable predetermined piercing device, pierced with punch die, etc. At least one attachment feature is provided, shown generally at 106, that is a hook or snap feature. Most preferably, at least two attachment features 106, are provided with corresponding elements operably to connect the first and second pieces together 102 and 104. FIG. 2 illustrates each attachment feature 106 is a hook like feature, such as a snap-in feature.

Preferably, the snap features 106,106 are opposingly disposed where the first and second sections 102,104 meet in at least two locations of the step board 100, preferably, generally along longitudinal edges of the sections 102,104 to snap together. Preferably, each snap feature 106 includes corresponding detent to operably snap 102,104 together or hooked together. Both attachment features 106,106 are preferably adapted for the first and second sections 102,104 to snap together.

Preferably, on at least one of the attachment features 106, at least one interior wall 110 is provided forming part of a receiving portion 106*a*, e.g., channel, in one of the first or second pieces 102,104. A corresponding lip or flange 106*c* of the other of the first or second pieces 102,104 fits withing the receiving portion 106*a*. A second interior wall 106*b*, preferably with predetermined detent, is formed in one of the first or second pieces 102,104 and forms part of a second channel. A corresponding part 106*d* of the other piece 102,104 is held against the second wall 106*b*. Preferably, 106*c* snaps into place with 106*d* retaining 106*c* from backing out when undesired with a corresponding lip or barb. The at least one interior wall 110 additionally provides strength.

By way of example, one of the snap features 106 connects the first and second pieces 102 and 104 at one longitudinal side edge, and then the free side of the first piece 102 (or second piece 104) is rotated until brought into engagement with the unconnected side of the second piece 104 (or first piece 102) and the other snap feature 106 connects the first and second pieces 102 and 104 together.

The apertures 105 are formed in predetermined locations as required for at least one predetermined component or part, e.g., step mats, end caps, bracket attachments, linkage attachments 212 adapted for connecting the running board 100 to the vehicle, and etc. FIG. 2 depicts apertures 105 in the second piece 104, e.g., upper surface for a step surface mat, and at least one aperture 105 on the first piece 102, e.g., along a channel 108 formed in the first piece 102 adapted for strength, predetermined properties, and/or to conceal attachments of predetermined parts, e.g., step deploying linkage brackets, etc.

The first and second sections 102 and 104 are preferably aluminum extrusions. Alternative extrusion materials are contemplated suitable for a step board depending on the particular application without departure from the scope of the present invention. By way of non-limiting example, molded step board sections, lightweight molded material, composite, aluminum, other metal material(s), etc., and any combinations thereof.

More pieces are contemplated than two depending on the particular application without departure from the scope of the present invention.

While FIG. 2 generally depicts attachment features 106, 106 incorporating a hook feature (snap feature) on both sides, it is understood that any alternative attachment feature or combination of attachment features shown in FIGS. 2-7 or described herein are contemplated depending on the application without departure from the scope of the present invention.

Figure 3:
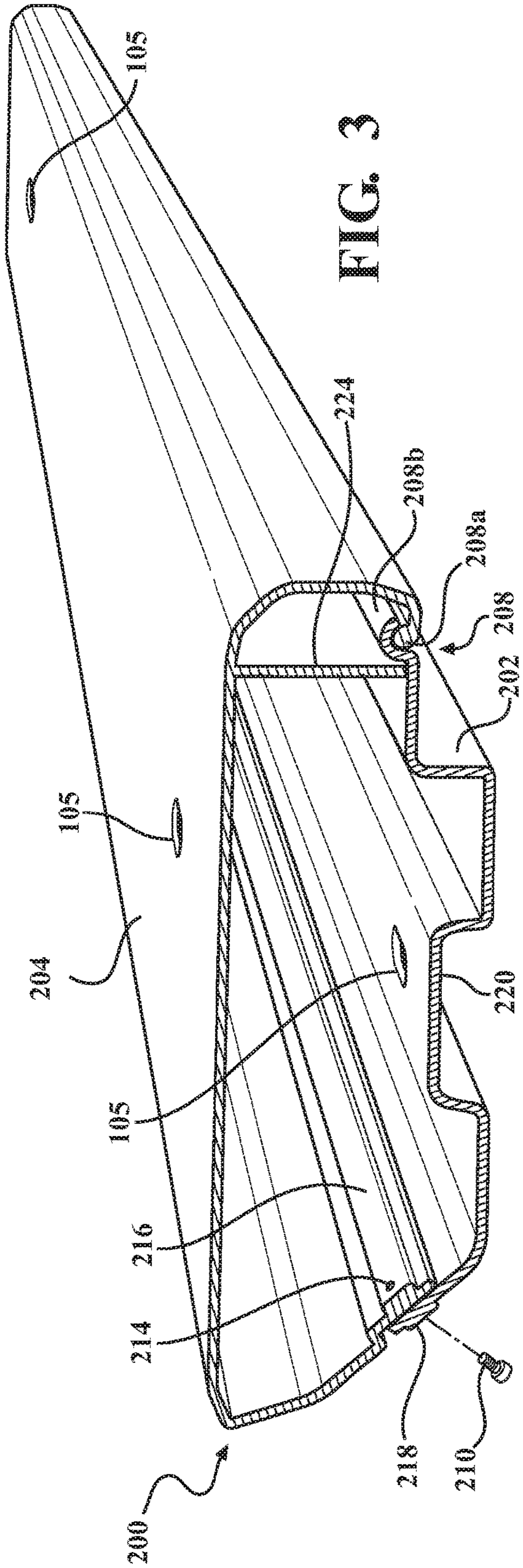
FIG. 3 is a perspective view of the multi-piece step board incorporating attachment features including at least one hook feature, in accordance with aspects of the present invention.
Figure 4:
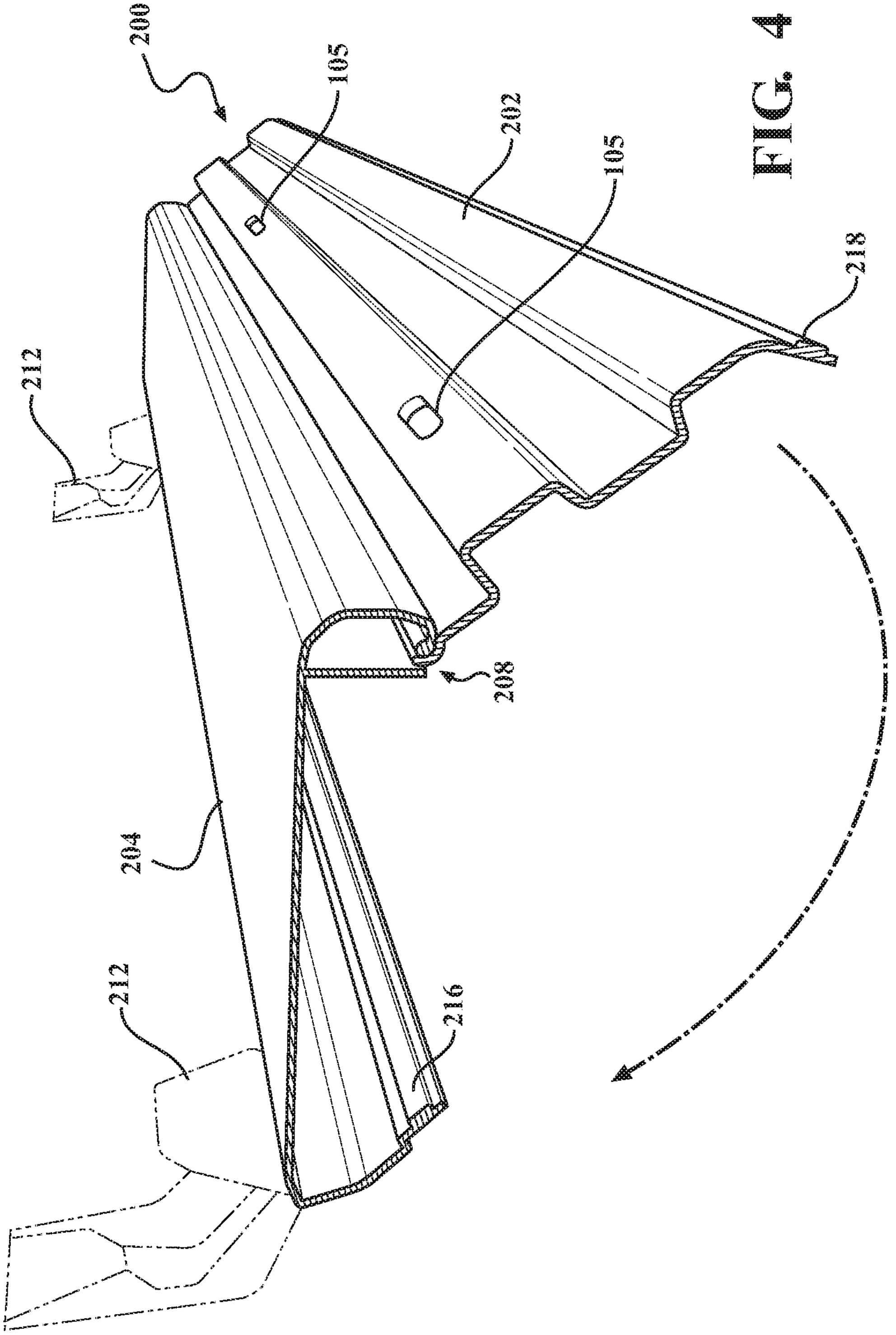
FIG. 4 is a perspective view of the multi-piece step incorporating attachment features and depicting rotation of a first piece to attach at both sides, in accordance with aspects of the present invention.

Referring generally to FIGS. 2-7, and more particularly to FIGS. 3-4, there is depicted the step board shown generally at 200 that is a split design in accordance with the present invention. The step board 200 is a multi-piece board, most preferably, a two-piece board. A first piece 202 (e.g., lower section) and a second piece 204 (e.g., upper section) that can each be easily pierced at predetermined location(s) to create at least one aperture 105; generally, a plurality of apertures 105 at a plurality of predetermined locations as required for at least one predetermined component or part, e.g., step mats, end caps, bracket attachments, linkage attachments 212 adapted for connecting the running board 200 to the vehicle, and etc. The predetermined plurality of apertures 105 are made before both pieces 202,204 are secured together, e.g., suitable predetermined piercing device, pierced with punch die, etc.

At least two attachment features are provided, indicated generally at 208. In accordance with the present invention, there is depicted one first attachment feature that is at least one hook like feature on one side and one second attachment feature that is at least one mechanical attachment on the other side. The hook feature indicated generally at 208 is provided to affix the first and second pieces together 202 and 204 in a first location, e.g., on at least one side such as along a first longitudinal edge. The other side is mechanically secured with a plurality of fasteners 210, e.g., rivets, screws, etc., through a plurality of apertures 214, respectively.

The first attachment feature 208 incorporates a raised lip, flange, welt, or other protrusion formed in one of the first or second pieces 202,204 (e.g., the second piece 204 in FIGS. 3-4) and a correspondingly sized integrated channel or retainer portion 208*b* formed on the other of the first or second pieces 202,204 (e.g., the first piece 202 in FIGS. 3-4) forming a mating surface for connecting the first piece 202 to the second piece 204.

The second attachment feature 208 incorporates a mechanical attachment. Preferably, there is provided a ridge 218 (alternatively, a plurality of bosses) formed in one of the first or second pieces 202,204 (e.g., the first piece 202 in FIGS. 3-4) each with apertures 214 to receive a fastener 210. There is provided a second ridge 216 formed on the other of the first or second pieces 202,204 (e.g., the second piece 204 in FIGS. 3-4) with a plurality of apertures 214 to each receive a fastener 210. The plurality of fasteners 210 mechanically secure the first piece 202 and second piece together 204 along one side of the board 200, while the hook features 208*a*,208*b* connect the first piece 202 and second piece 204 together along the other side of the board 200. The ridges can provide a strengthened location operable for attachment of the pieces 202,204, e.g., with fasteners 210, as needed.

The apertures 105 are formed in predetermined locations as required for at least one predetermined component, part, or accessory, e.g., step mats, end caps, bracket attachments, linkage attachments 212 adapted for connecting the running board 200 to the vehicle, and etc. FIGS. 3-4 depict apertures 105 in the second piece 204, e.g., upper surface for a step surface mat, and at least one aperture 105 on the first piece 202, e.g., along a channel 220 formed in the first piece 202 adapted for strength, predetermined properties, and/or to conceal attachments of predetermined parts, e.g., step deploying linkage brackets, etc.

At least one interior wall 224 is provided, e.g., for predetermined strength or other properties, to form part of either attachment feature, etc.

FIG. 4 depicts the hook feature 208 connecting the first and second pieces 202 and 204 at a first location (e.g., along the mating longitudinal edges of 202 and 204), and then the first piece 202 is operably rotated generally upward (as indicated by the arrow in FIG. 4) until brought into engagement with the attachment portions of the second piece 204. Each fastener 210 then connects the first and second pieces 202 and 204 together (see FIG. 3) at the mechanical attachment portion 216,218. This arrangement also allows for simpler maintenance and replacement of the first or second sections 202 and 204 when desired.

The first and second sections 202 and 204 are preferably aluminum extrusions. Alternative extrusion materials are contemplated suitable for a step board depending on the particular application without departure from the scope of the present invention. By way of non-limiting example, molded step board sections, lightweight molded material, composite, aluminum, other metal material(s), etc., and any combinations thereof.

More pieces are contemplated than two depending on the particular application without departure from the scope of the present invention.

While FIGS. 3-4 generally depict attachment features 208,208 incorporating a hook feature on one side and mechanically attached on the other side, it is understood that any alternative attachment feature or combination of attachment features shown in FIGS. 2-7 or described herein are contemplated depending on the application without departure from the scope of the present invention.

Figure 5:
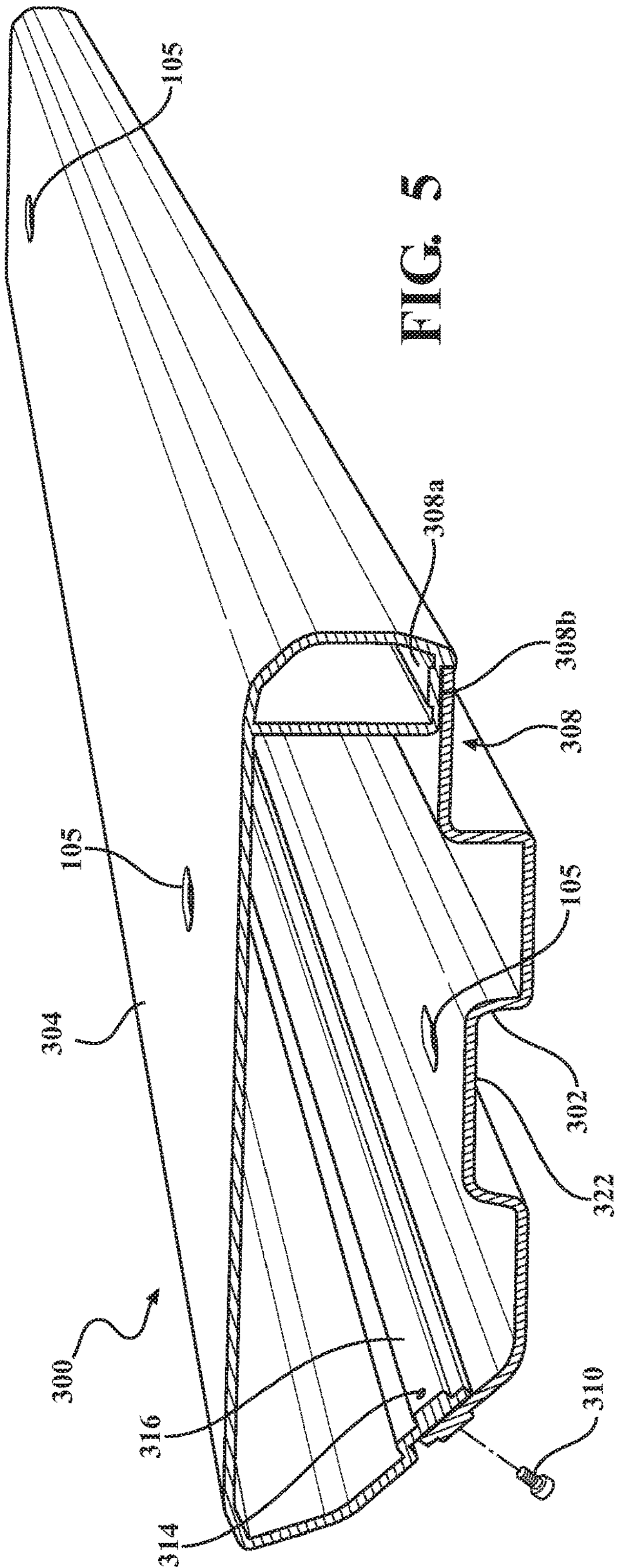
FIG. 5 is a perspective view of the multi-piece step board incorporating attachment features including at least one mechanical feature, in accordance with aspects of the present invention.
Figure 7:
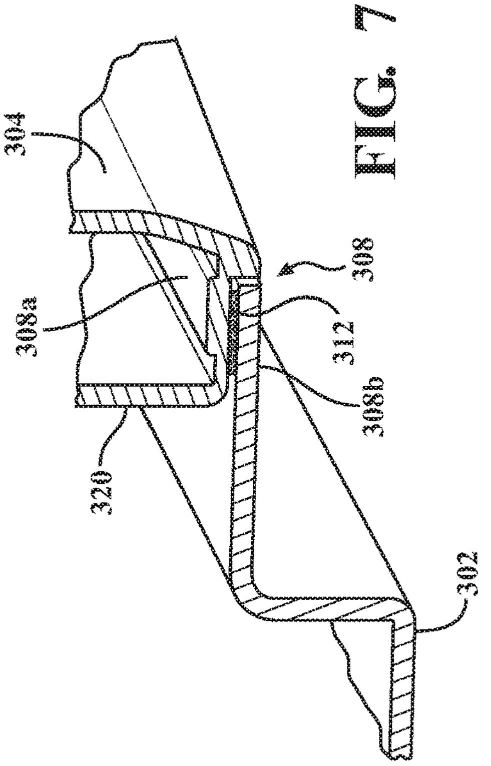
FIG. 7 is an enlarged perspective view of the multi-piece step board incorporating attachment features including adhesive, in accordance with aspects of the present invention.
Figure 6:
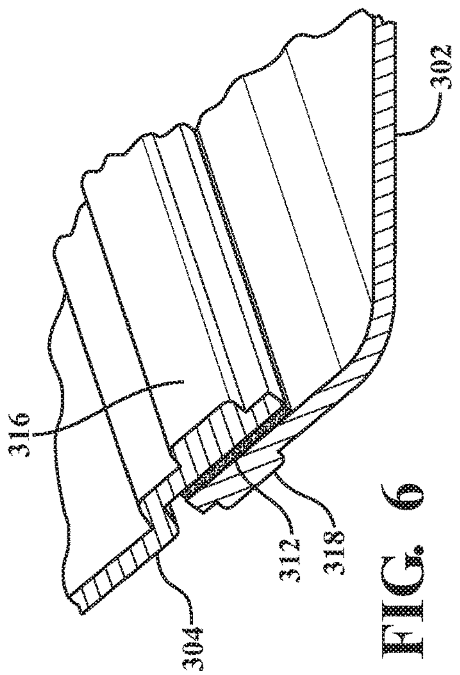
FIG. 6 is a perspective view of the multi-piece step board incorporating attachment features including adhesive, in accordance with aspects of the present invention.

Referring generally to FIGS. 2-7, and more particularly to FIGS. 5-7, there is depicted the step board shown generally at 300 that is a split design in accordance with the present invention. The step board 200 is a multi-piece board, most preferably, a two-piece board. A first piece 302 (e.g., lower section) and a second piece 304 (e.g., upper section) that can each be easily pierced at predetermined location(s) to create at least one aperture 105; generally, a plurality of apertures 105 at a plurality of predetermined locations as required for at least one predetermined component or part, e.g., step mats, end caps, bracket attachments, linkage attachments 212 adapted for connecting the running board 300 to the vehicle, and etc. The predetermined plurality of apertures 105 are made before both pieces 302, 304 are secured together, e.g., suitable predetermined piercing device, pierced with punch die, etc. In FIGS. 5-7, there is depicted the first and second sections 302 and 304 mechanically secured in place and also incorporating adhesive, in accordance with the present invention.

At a first attachment feature portion, shown generally at 308, adhesive 312 secures the first and second pieces 302 and 304 together. Preferably, the first attachment feature 308 incorporates a ridge 308*a* on one of the first or second pieces 302,204 (e.g., the second piece 304 in FIGS. 5 and 7). The ridge can provide a strengthened mating interface at the location of attachment of the pieces 302,304, as needed. The first attachment feature portion 308 has a corresponding surface 308*b* formed on the other of the first or second pieces 302,304 (e.g., the first piece 302 in FIGS. 5 and 7) forming a mating surface for connecting the first piece 302 and second piece 304 together with adhesive 312. Thus, on one side of the board 300, the first and second pieces 302,304 are connected with adhesive 312. At least one interior wall 320 is provided, e.g., for predetermined strength or other properties, that preferably further extends in a direction operably to form the surface 308*a* for adhering one piece (302 or 304) to the corresponding surface 308*b* of the other piece (304 or 302) with the adhesive 312.

The other side of the board 300 is mechanically secured. At least one, mechanical interference feature 308 is provided to couple the first and second pieces together 302 and 304 on at least one side, e.g., along a first longitudinal edge. An adhesive bond may be used at the mechanical interference 308 areas. The other edge is mechanically secured with a plurality of fasteners 310, e.g., rivets, screws, etc.

Preferably, there is provided a ridge 318 (alternatively, a plurality of bosses) formed in one of the first or second pieces 302,304 (e.g., the first piece 302 in FIG. 5) with apertures 314 each to receive a fastener 310. There is provided a second ridge 316 formed on the other of the first or second pieces 302,304 (e.g., the second piece 304 in FIG. 5) with a plurality of apertures 314 to each receive a fastener 310. The plurality of fasteners 310 mechanically secure the first piece 302 and second piece together 304 along one side of the board 300, while the adhesive 312 connects the first piece 302 and second piece 304 together along the other side of the board 300.

The apertures 105 are formed in predetermined locations as required for at least one predetermined component or part, e.g., step mats, end caps, bracket attachments, linkage attachments 212 adapted for connecting the running board 300 to the vehicle, and etc. FIG. 5 depicts apertures 105 in the second piece 304, e.g., upper surface for a step surface mat, and at least one aperture 105 on the first piece 302, e.g., along a channel 322 formed in the first piece 302 adapted for strength, predetermined properties, and/or to conceal attachments of predetermined parts, e.g., step deploying linkage brackets, etc.

Referring generally to FIG. 6-7, in accordance with the present invention, there is depicted adhesive bond on both sides instead of mechanically secured in place. Alternatively, adhesive bonding is used in combination with hook/snap features according to any of FIGS. 2-7 in any combination.

Referring more particularly to FIGS. 6-7, alternatively, an adhesive bond is used 312 and 312 to secure both sides of the first section 302 and second section 304 together. While FIGS. 6-7 generally depict attachment features 308 incorporating adhesive to connect the first and second pieces 302 and 304 together on both sides, it is understood that any alternative attachment feature or combination of attachment features shown in FIGS. 2-7 or described herein are contemplated depending on the application without departure from the scope of the present invention.

While FIGS. 5 and 7 generally depict attachment features 308 incorporating adhesive on one side and mechanically attached on the other side, it is understood that any alternative attachment feature or combination of attachment features shown in FIGS. 2-7 or described herein are contemplated depending on the application without departure from the scope of the present invention.

Referring to FIGS. 5-7 generally the first and second sections 302 and 304 are preferably aluminum extrusions. Alternative extrusion materials are contemplated suitable for a step board depending on the particular application without departure from the scope of the present invention. By way of non-limiting example, molded step board sections, lightweight molded material, composite, aluminum, other metal material(s), etc., and any combinations thereof.

Referring to FIGS. 2-7 generally, it is understood that more pieces (than a first and second) are contemplated depending on the particular application without departure from the scope of the present invention.

While a two 2-piece extruded running board step with a section split in two is described, it is understood that more sections are contemplated depending on the application without departure from the scope of the present invention.

It is understood that more or less apertures 105 can be used depending on the particular application without departure from the scope of the present invention. It is understood that any alternative sizes, shapes, and locations of apertures 105 suitable for the particular application are contemplated without departure from the scope of the present invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A step board assembly adapted for a vehicle, comprising:

a first piece of a step board;

a second piece of a step board;

a plurality of apertures provided in the first and/or second piece at predetermined locations adapted for selectively connecting at least one predetermined component to said step board; and at least two attachment features connecting the first and second pieces together in two locations, wherein one of the at least two attachment features includes a first hook feature defined along a first longitudinal edge of the first piece and a second hook feature defined along a first longitudinal edge of the second piece, the first hook feature is overlapped with and has a shape that is complementary to a shape of the second hook feature, and wherein the second piece includes an interior wall spaced from the second hook feature by a gap and the first hook feature is received through the gap, wherein the first hook feature and the second hook feature have arcuate surfaces and allow one of the first piece or the second piece to rotate relative to the other of the first piece and the second piece to bring a second longitudinal edge of the first piece into contact with a second longitudinal edge of the second piece after the first hook feature is overlapped with the second hook feature, and one of said attachment features incorporates a mechanical attachment with a plurality of fasteners connecting the first piece and the second piece along the second longitudinal side of each of the first piece and second piece.

2. The step board assembly of claim 1, wherein the board is a 2-piece extrusion board comprising the first piece and the second piece, wherein said first and second pieces are an upper section and a lower section of the board.

3. The step board assembly of claim 1, wherein one of said attachment features incorporates a mechanical attachment with a plurality of fasteners connecting the first and second pieces together along a second longitudinal edge of the first piece and a second longitudinal edge of the second piece, or one of said attachment features incorporates adhesive connecting the first and second pieces together along the second longitudinal edge of the first piece and the second longitudinal edge of the second piece.

4. The step board assembly of claim 1, wherein the step board assembly is a running board step adapted for connecting to the vehicle.

5. The step board assembly of claim 1, wherein said at least two attachment features include at least one pair of mechanical attachments to mechanically secure the first and second pieces together in the two locations.

6. The step board assembly of claim 1, wherein the first and second pieces are adhesive bonded together in at least one location.

7. The step board assembly of claim 1, wherein the first and second piece are each aluminum extrusions.

8. The step board assembly of claim 1, wherein the first piece is a lower section, and the second piece is the upper section of the step board.

9. The step board assembly of claim 8 wherein the interior wall extends downwardly from the second piece to a free end that defines part of the gap, and the first hook feature is received over part of the second hook feature and part of the first piece is received below the free end of the interior wall.

10. The step board assembly of claim 1, further comprising a plurality of attachment brackets operably connected with the step board and adapted to operably connect to the vehicle to provide a vehicle step.

11. The step board assembly of claim 1, further comprising a plurality of attachment brackets and/or linkages operably connected with the step board and adapted to connect to the vehicle.

12. The step board assembly of claim 1, wherein the sideboard assembly is adapted to operably couple to a sport utility vehicle or pickup truck.

13. The step board assembly of claim 1, wherein the plurality of apertures is not pierced on a closed one piece section.

14. A step board assembly, comprising:

a split 2-piece extrusion board comprising a first piece and a second piece;

a plurality of apertures provided in the first and second pieces at predetermined locations adapted for selectively connecting at least one predetermined component; and a plurality of attachment features connecting the first and second pieces together along both longitudinal sides of the upper and lower sections wherein the attachment features include a first hook feature defined along a first longitudinal side of the first piece and a second hook feature define along a first longitudinal side of the second piece, the first hook feature is overlapped with and has a shape that is complementary to a shape of the second hook feature, and wherein the second piece includes a longitudinally extending gap adjacent to the second hook feature and the first hook feature is received through the gap, and the attachment features include multiple fasteners connecting a second longitudinal side of the first piece and a second longitudinal side of the second piece, wherein the first hook feature and the second hook feature are arranged to allow one of the first piece or the second piece to rotate relative to the other of the first piece and the second piece to bring the second longitudinal edge of the first piece into contact with the second longitudinal edge of the second piece after the first hook feature is overlapped with the second hook feature.

15. A step board assembly adapted for a vehicle, comprising:

an upper section of a board with a plurality of apertures formed through the upper section, said plurality of apertures adapted for selectively connecting at least one predetermined component;

a lower section of the board with a plurality of apertures formed through the lower section, said plurality of apertures adapted for selectively connecting at least one predetermined component; and a plurality of attachment features connecting said upper and lower sections together along longitudinal portions of the upper and lower sections, wherein the attachment features include a first hook feature defined along a first longitudinal edge of the lower section and a second hook feature define along a first longitudinal edge of the upper section, and wherein the upper section includes an interior wall that extends to a free end that is spaced from the second hook feature, and the first hook feature is received over part of the second hook feature and part of the first piece is received below the free end of the interior wall so that the first hook feature is retained between the free end of the interior wall and the second hook feature, wherein the first hook feature and the second hook feature are arranged to allow one of the first piece or the second piece to rotate relative to the other of the first piece and the second piece to bring the second longitudinal edge of the first piece into contact with the second longitudinal edge of the second piece after the first hook feature is overlapped with the second hook feature.

* * * * *